United States Patent
Jones et al.

(10) Patent No.: US 9,244,936 B1
(45) Date of Patent: Jan. 26, 2016

(54) SYSTEMS AND METHODS FOR ENABLING DEDUPLICATION OF ATTACHMENT FILES WITHIN A DATABASE

(75) Inventors: Richard Jones, Charvil (GB); Patrick Ou, Longwood, FL (US); Kirk Searls, Maitland, FL (US); Weibao Wu, Vadnais Heights, MN (US); Xianbo Zhang, Madison, WI (US)

(73) Assignee: Symantec Corporation, Mountain View, CA (US)

( * ) Notice: Subject to any disclaimer, the term of this patent is extended or adjusted under 35 U.S.C. 154(b) by 416 days.

(21) Appl. No.: 12/914,732

(22) Filed: Oct. 28, 2010

(51) Int. Cl.
*G06F 7/00* (2006.01)
*G06F 17/30* (2006.01)
*G06F 3/06* (2006.01)

(52) U.S. Cl.
CPC ........ *G06F 17/30156* (2013.01); *G06F 3/0641* (2013.01)

(58) Field of Classification Search
CPC .................................................... G06F 3/0641
USPC .......................................................... 707/692
See application file for complete search history.

(56) References Cited

U.S. PATENT DOCUMENTS

| | | | |
|---|---|---|---|
| 7,783,604 B1* | 8/2010 | Yueh | 707/640 |
| 7,844,676 B2* | 11/2010 | Prahlad et al. | 709/206 |
| 2005/0270996 A1* | 12/2005 | Yi et al. | 370/312 |
| 2007/0150853 A1* | 6/2007 | Deshpande | 717/104 |
| 2010/0070474 A1* | 3/2010 | Lad | 707/624 |
| 2010/0332454 A1* | 12/2010 | Prahlad et al. | 707/654 |

* cited by examiner

*Primary Examiner* — Tony Mahmoudi
*Assistant Examiner* — Mohammad Rahman
(74) *Attorney, Agent, or Firm* — Rory D. Rankin; Meyertons, Hood, Kivlin, Kowert & Goetzel, P.C.

(57) ABSTRACT

A computer-implemented method for enabling deduplication of attachment files within a database is described. A database file comprising data blocks of an attachment file positioned intermittently among data blocks of the database file is inspected. A first map may be generated from the inspection of the database file and the attachment file. The data blocks of the database file and the data blocks of the attachment file are identified according to the first map. The data blocks of the database file are written to a database data file. The data blocks of the attachment file are written to an attachment data file. The attachment data file is deduplicated with at least one other data file.

20 Claims, 12 Drawing Sheets

SYSTEMS AND METHODS FOR ENABLING DEDUPLICATION OF ATTACHMENT FILES WITHIN A DATABASE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone that uses and relies on computers.

Data stored on a computing device may become corrupted and inaccessible. A backup of the data may be performed in order to restore the data in the event the data becomes corrupted and inaccessible. A backup refers to making copies of the data. These copies of data may be used to restore the original data after a data loss event. Backups may be useful for many purposes. For example, backups may restore data following a disaster. This may be referred to as disaster recovery. In addition, backups may restore a small number of files that have been accidentally deleted or corrupted.

In order to conserve storage space within a storage device, duplicate data may not be stored. Deduplication techniques may be implemented so that only a single copy is stored within the storage device. Different backup processes may backup a file to the storage device. These various processes may cause deduplication techniques to be ineffective, which may lead to duplicate data being stored on the storage device. As a result, benefits may be realized by providing systems and methods for enabling deduplication of files across various backup processes.

SUMMARY

According to at least one embodiment, a computer-implemented method for enabling deduplication of attachment files within a database is described. A database file comprising data blocks of an attachment file positioned intermittently among data blocks of the database file is inspected. A first map is generated from the inspection of the database file and the attachment file. The data blocks of the database file and the data blocks of the attachment file are identified according to the first map. The data blocks of the database file are written to a database data file. The data blocks of the attachment file are written to an attachment data file. The attachment data file is deduplicated with at least one other data file.

In one embodiment, the at least one other data file may be an archived file. The at least one other data file may be a data file backed up by a file system. The database may be an Exchange Database.

In one example, a second map may be generated that indicates original positions of the data blocks of the attachment file among the data blocks of the database file. A transformed database file may also be created. In one configuration, the transformed database file may include a second map, the database data file, and the attachment data file. The second map may be retrieved to cache. The database file may be restored from the transformed database file by positioning the data blocks of the attachment file among the data blocks of the database file in the original positions according to the second map.

A computing device configured to enable deduplication of attachment files within a database is also described. The computing device includes a processor and memory in electronic communication with the processor. The computing device may also include a transforming module configured to inspect a database file comprising data blocks of an attachment file positioned intermittently among data blocks of the database file. The transforming module may be configured to generate a first map from the inspection of the database file and the attachment file. The transforming module may be further configured to identify the data blocks of the database file and the data blocks of the attachment file according to the first map. The addition, the transforming module may be configured to write the data blocks of the database file to a database data file, and write the data blocks of the attachment file to an attachment data file. Further, the transforming module may be configured to deduplicate the attachment data file with at least one other data file.

A computer-program product for enabling deduplication of attachment files within a database is also described. The computer-program product includes a computer-readable medium having instructions thereon, the instructions including code programmed to inspect a database file comprising data blocks of an attachment file positioned intermittently among data blocks of the database file, and generate a first map from the inspection of the database file and the attachment file. The instructions further including code programmed to identify the data blocks of the database file and the data blocks of the attachment file according to the first map. The instructions also including code programmed to write the data blocks of the database file to a database data file, and code programmed to write the data blocks of the attachment file to an attachment data file. The instructions also including code programmed to deduplicate the attachment data file with at least one other data file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
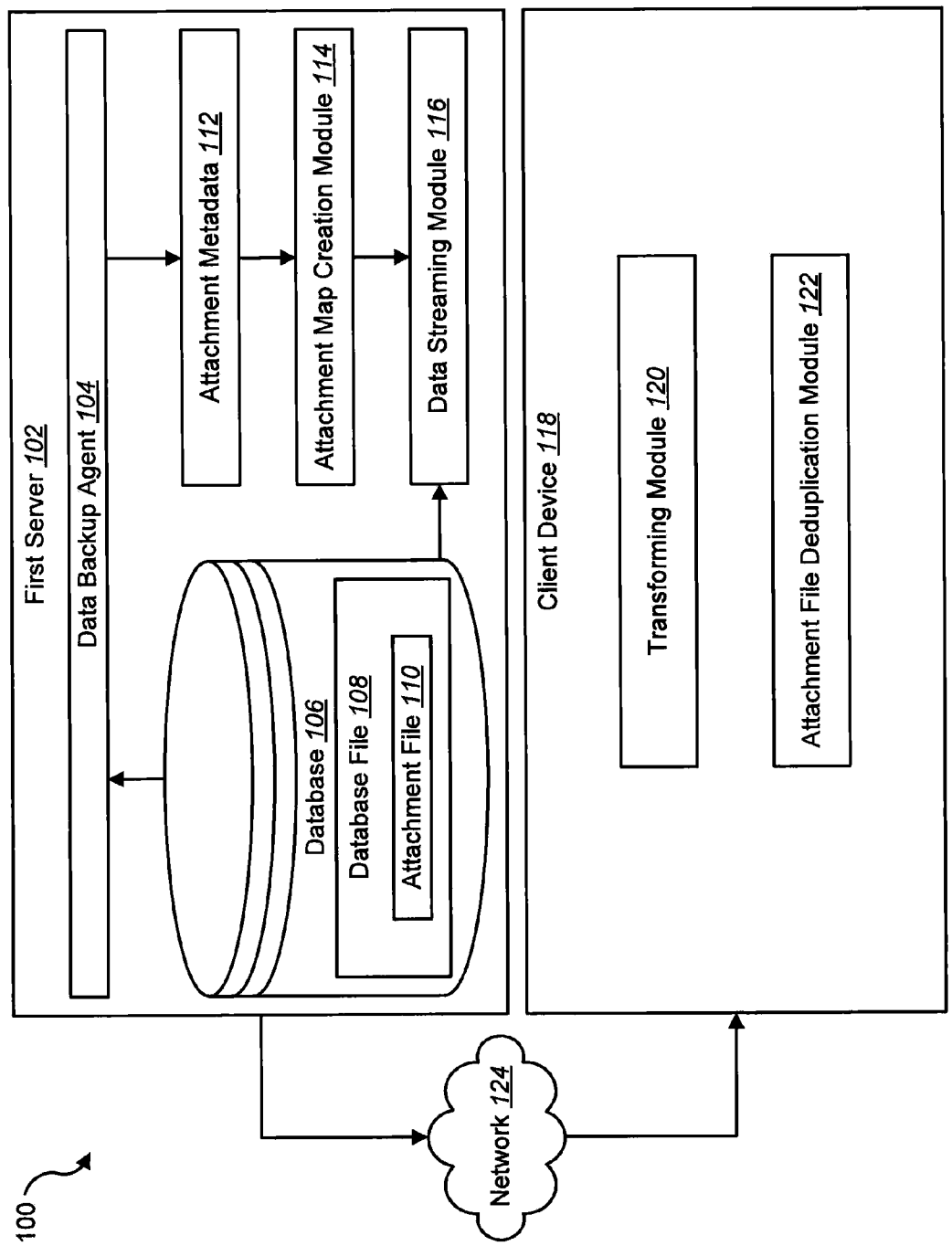
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Computer files may include attachment files. For example, an e-mail message may include an attachment. In some embodiments, these files and attachments may reside on a database, such as an Exchange Database. These types of files may be referred to as Exchange Database (EDB) files. In one example, an EDB file and an attachment may be backed-up and stored on a backup storage device. In addition to EDB files and attachments, the backup storage device may store archived files and backed-up files. Regarding attachment files, deduplication may occur so that the backup storage device does not store duplicate copies of an attachment file. Attachment files, however, associated with EDB files may be in a different format than the other files stored on the backup storage device. As a result, deduplication for attachment files associated with EDB files may not occur.

The present systems and methods may enable deduplication of attachment files that are attached to EDB files. An example of an EDB file may be an e-mail message. In accordance with the present system and methods, an attached file may be deduped with other copies of the file in an EDB or copies of the file that are backed up directly from a file system or that are in archives. In one embodiment, the EDB files, the files backed up directly from the file system, and the archived files may all be stored on the same backup storage device.

As previously mentioned, attachment files that are embedded within database files are not normally dedupable with other copies of the same file backed from the file system or copies that exist in an archive in a backup storage device. Databases generally use 'pages' in a database file according to their own proprietary format. As a result, page headers and other metadata may be interspersed with the real file data. The page headers and other metadata may disrupt matching algorithms that are normally used for deduplication.

When matching algorithms used for deduplication are disrupted, identical Exchange attachments may be duplicated in the same deduplication storage device, which may be shared by file system backup and archive products. For example, if a customer installs a backup product such as Backup Exec. and an archive product such as Enterprise Vault, the same attachment may exist in both the backup set and the archive even though the same deduplication storage device is used for both of them. In one example, EDB may not be a single instant storage (SIS) attachment database. As a result, there may be multiple copies of the same attachment stored in the EDB. Exchange may break attachment content into multiple data blocks and store the blocks intermittently among a database file. Exchange may store database metadata between the data blocks, for example, page/block header, etc. In one embodiment, each page header may have a unique signature. Currently, when deduplication of the storage device occurs on an EDB, the attachment level deduplication rate is zero or non-existent. As a result, the present system and methods may arrange an attachment file in an EDB so that the attachment file may be deduplicated across the EDB as well as with other types of archive files and backup files stored on a backup storage device.

FIG. 1 is a block diagram illustrating one embodiment of an environment 100 in which the present systems and methods may be implemented. In one configuration, a first server 102 may communicate with a client device 118 across a network connection 124. The first server 102 may be an Exchange server.

In one embodiment, the first server 102 may include a database 106. In one example, the database 106 may be an EDB. In one configuration, the database 106 may store a database file 108. The database file 108 may include or be linked to an attachment file 110. An example of the database file 108 may an e-mail message. The attachment file 110 may be an attachment connected to or interjected in the e-mail message. The first server 102 may also include a data backup agent 104. The agent 104 may be a Backup Exec. Remote Agent for Windows Servers. The backup agent 104 may receive and inspect information from the database 106 regarding the database file 108 and the attachment file 110. The backup agent 104 may capture attachment metadata 112 associated with the attachment file 110. In one embodiment, an attachment map creation module 114 may use the attachment metadata 112 to generate an attachment block map. The attachment block map may indicate the positions of the various data blocks of the attachment file 110 that are interjected intermittently amongst the data blocks of the data base file 108. The first server 102 may further include a data streaming module 116. The streaming module 116 may stream the attachment block map and the database file 108 (that includes the attachment file 110) to the client device 118 across the network connection 124.

In one example, the client device 118 may include a transforming module 120 and an attachment file deduplication module 122. The transforming module 120 may transform the received database file 108 into a particular format so that the attachment file deduplication module 122 may perform deduplication processes for the attachment file 110 with duplicate files that may exist in archive or other backup files. Details regarding the transforming module 120 will be discussed below. In one embodiment, the client device 118 be a personal computer (PC), a laptop, a personal digital assistant (PDA), or any other type of computing device.

Figure 2:
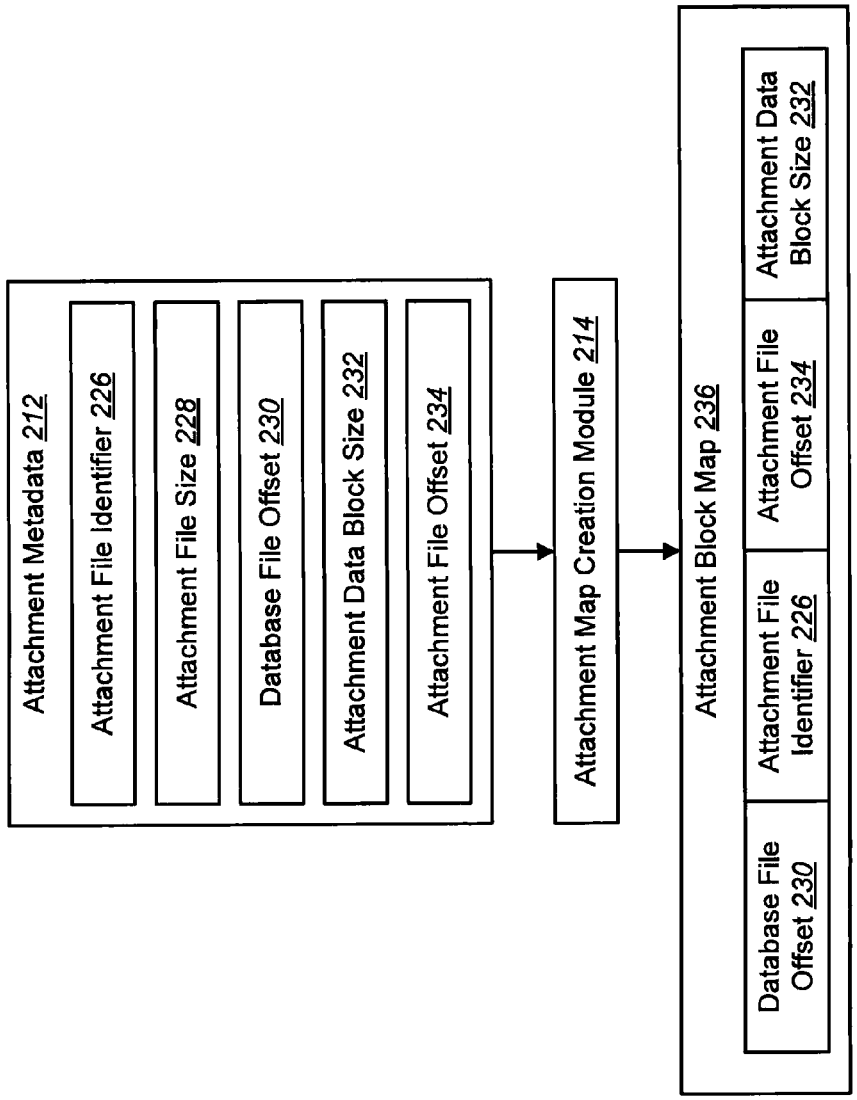
FIG. 2 is a block diagram illustrating one embodiment of attachment metadata.

FIG. 2 is a block diagram illustrating one embodiment of attachment metadata 212. As previously explained, the data backup agent 104 may capture the attachment metadata 212 for the attachment file 110 stored in the database 106. The attachment metadata 212 may include an attachment file identifier 226 that may identify the attachment file 110. The metadata 212 may also include an attachment file size 228 that may indicate the size of the attachment file 110. The metadata 212 may further include database file offset 230. The database file offset 230 may indicate the offset of the data blocks corresponding to the database file 108 in relation to the attachment file 110. Attachment data block size 232 may be metadata that indicates the size of each data block included in the attachment file 110. Attachment file offset 234 may indicate the offset of data blocks corresponding to the attachment file in relation to data blocks corresponding to the data base file 108.

In one configuration, an attachment map creation module 214 may use the attachment metadata 212 to generate an attachment block map 236. The attachment block map 236 may indicate how the data blocks of the attachment file 110 are intermittently positioned among the data blocks of the database file 108. For example, the attachment block map 236 may include the database file offset 230, the attachment file identifier 226, the attachment file offset 234, and the attachment data block size 232. A computing device, such as the client device 118 may use the attachment block map 236 to separate the data blocks of the database file 108 (i.e., the non-attachment file data blocks) from the data blocks of the attachment file 110. Details regarding the separation of database file data blocks from attachment file data blocks will be described below.

Figure 3:
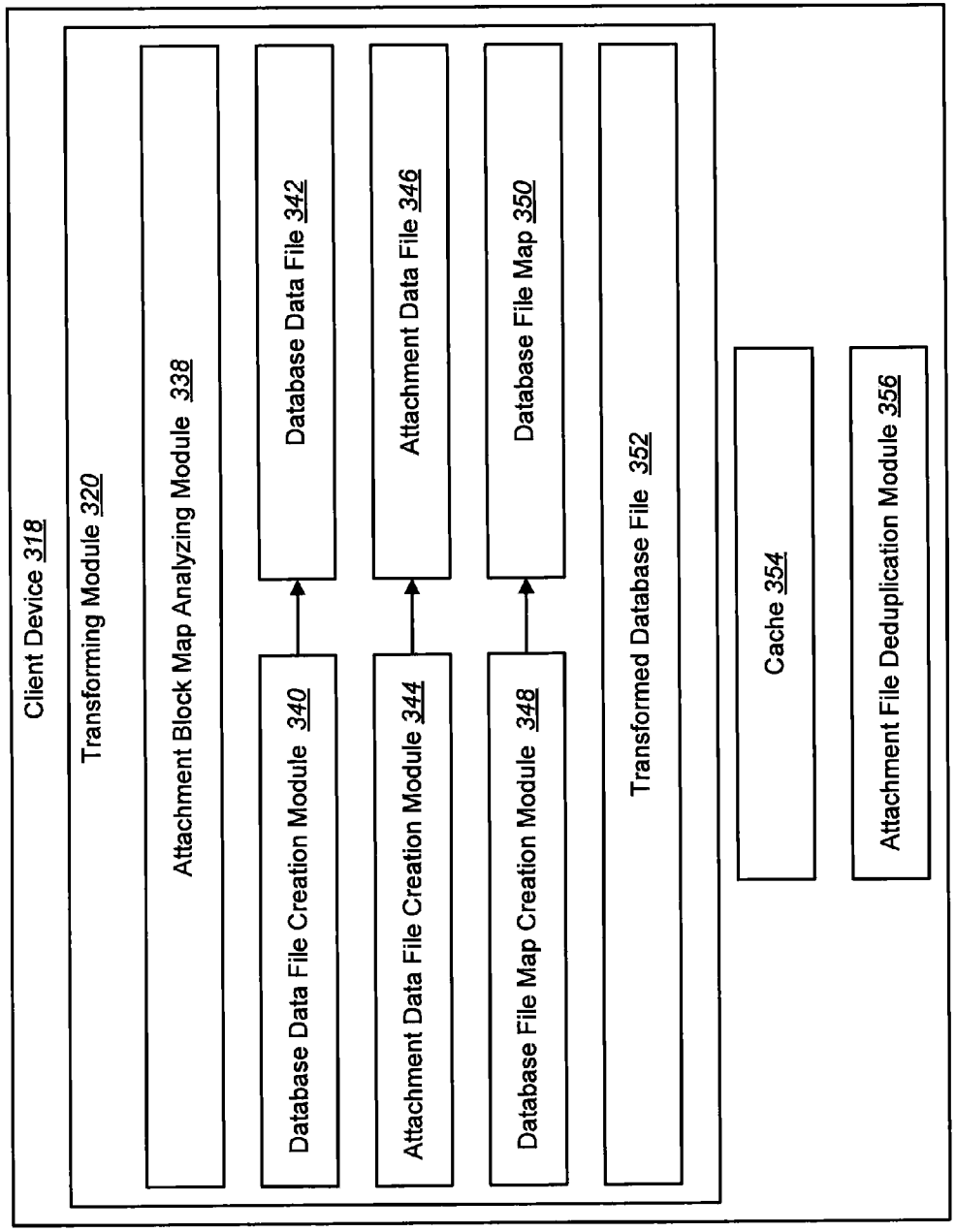
FIG. 3 is a block diagram illustrating one embodiment of a client device.

FIG. 3 is a block diagram illustrating one embodiment of a client device 318. The client device 318 may include a transforming module 320, cache 354, and an attachment file deduplication module 356.

In one configuration, the transforming module 320 may include an attachment block map analyzing module 338. The analyzing module 338 may analyze the attachment block map 236 that indicates the position and identity of data blocks of an attachment file 110 intermittently dispersed among data blocks of a database file 108. A database data file creation module 340 may use the results from the analyzing module 338 to strip or separate non-attachment data blocks (i.e., data blocks of the database file 108) to create a database data file 342, which may be a file that includes the data blocks of the database file 108 in sequential order.

In one embodiment, an attachment data file creation module 334 may also use the results of the analyzing module 338 to create an attachment data file 346 that includes just the data blocks corresponding to the attachment file 110. In order to create the attachment data file 346, the attachment data file creation module 344 may marshal attachment data blocks into at least one buffer in the cache 354. In one embodiment, the attachment data file creation module 344 may marshal attachment data blocks into one or more 128K buffers. When the buffer(s) in the cache 354 are full or an end of attachment file condition is satisfied, the contents of the one or more buffers in the cache 354 may be written to the attachment data file 346 in sequential order. As a result, the attachment data file 346 includes only the data blocks of the attachment file 110 in sequential order without the metadata typically added to the data blocks by the database 106, such as an EDB. Once the attachment data file 346 is created, an attachment file deduplication module 356 may perform deduplication on the attachment data file 346. The attachment data file 346 may be deduplicated across other archived files and backup files stored on the same backup storage device.

The transforming module 320 may also include a data base file map creation module 348. The creation module 348 may create a data base file map 350 that indicates the original positions of the data blocks of the attachment data file 346 and the data blocks of the database data file 342. In other words, the database file map 350 may be used to generate the original database file 108 with the data blocks of the attachment file 110 properly positioned intermittently among the data blocks of the database file 108. The transforming module 320 may synthesize the database data file 342, the attachment file 346, and the database file map 350 into a transformed database file 352. Details regarding the transformed database file 352 will be described below.

Figure 4:
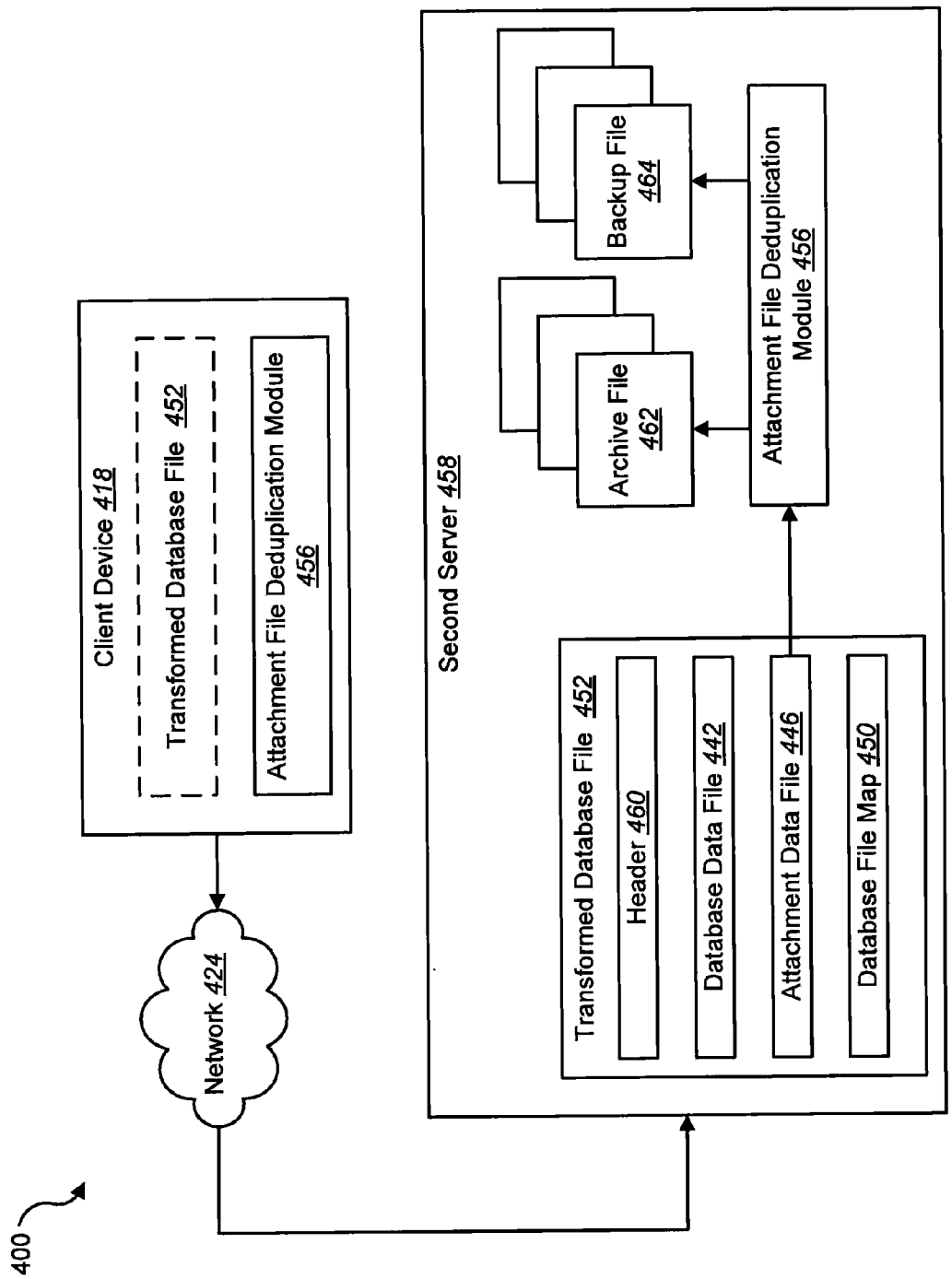
FIG. 4 is a block diagram illustrating one embodiment of storing a transformed database file on a backup storage device.

FIG. 4 is a block diagram illustrating one embodiment of an environment 400 to store a transformed database file 452 on a backup storage device, such as a second server 458. In one configuration, a client device 418 may transmit the transformed database file 452 across a network connection 424 to the second server 458. The transformed database file 452 may include header information 460, a database data file 442, an attachment data file 446, and a database file map 450, as previously explained. An attachment file deduplication module 456 may execute deduplication for the attachment data file 446. The deduplication may be executed by the client device 418 or the second server 458. The attachment data file 456 may be deduplicated across one or more archive files 462 and one or more backup files 464 stored on the second server 458. If the client device 418 performs the deduplication, some or all of the attachment data file 446 may not be transmitted to the second server 458 for storage if duplicate copies of some or all of the attachment file are already stored with the archived files 462 and/or the backup files 464.

Figure 5:
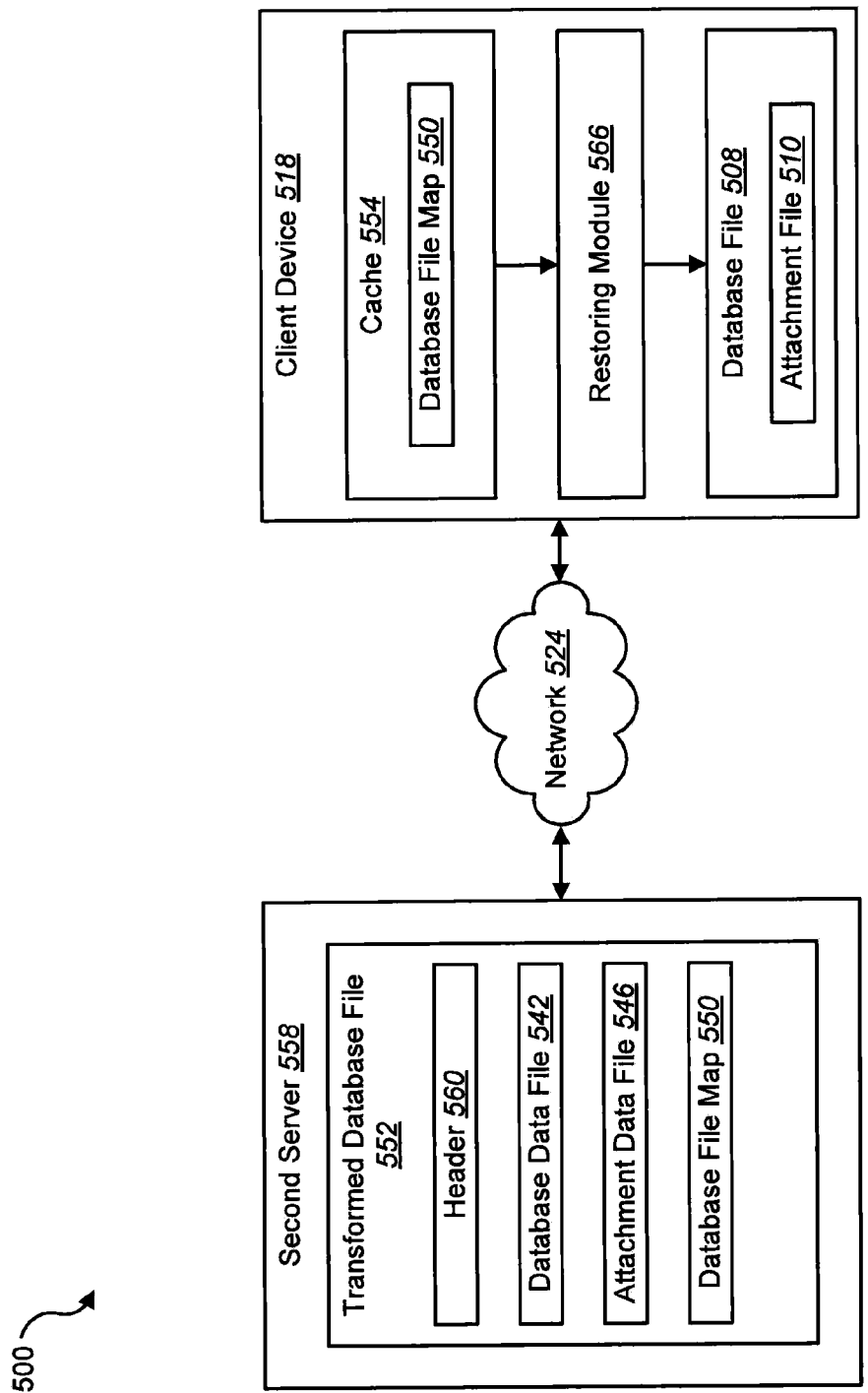
FIG. 5 is a block diagram illustrating one embodiment of restoring a transformed database file to an original database file.

FIG. 5 is a block diagram illustrating one embodiment of restoring a transformed database file 552 to an original database file 508. In one embodiment, a second server 558 may store the transformed database file 552. The transformed database file 552 may include a header 560, a database data file 542, an attachment data file 546, and a database file map 550. In one configuration, a client device 518 may retrieve the database file map 550 from the second server 558 and store the map 550 into cache 554. The remaining portions of the transformed database file 558 may be retrieved or streamed to the client device 518. A restoring module 566 may use the database file map 550 to arrange or position the data blocks of the attachment data file 546 among the data blocks of the database data file 542. As a result, the original database file 508 may be reconstructed to its original form with the data blocks of the attachment file 510 properly placed intermittently among the data blocks of the database file 508.

Figure 6:
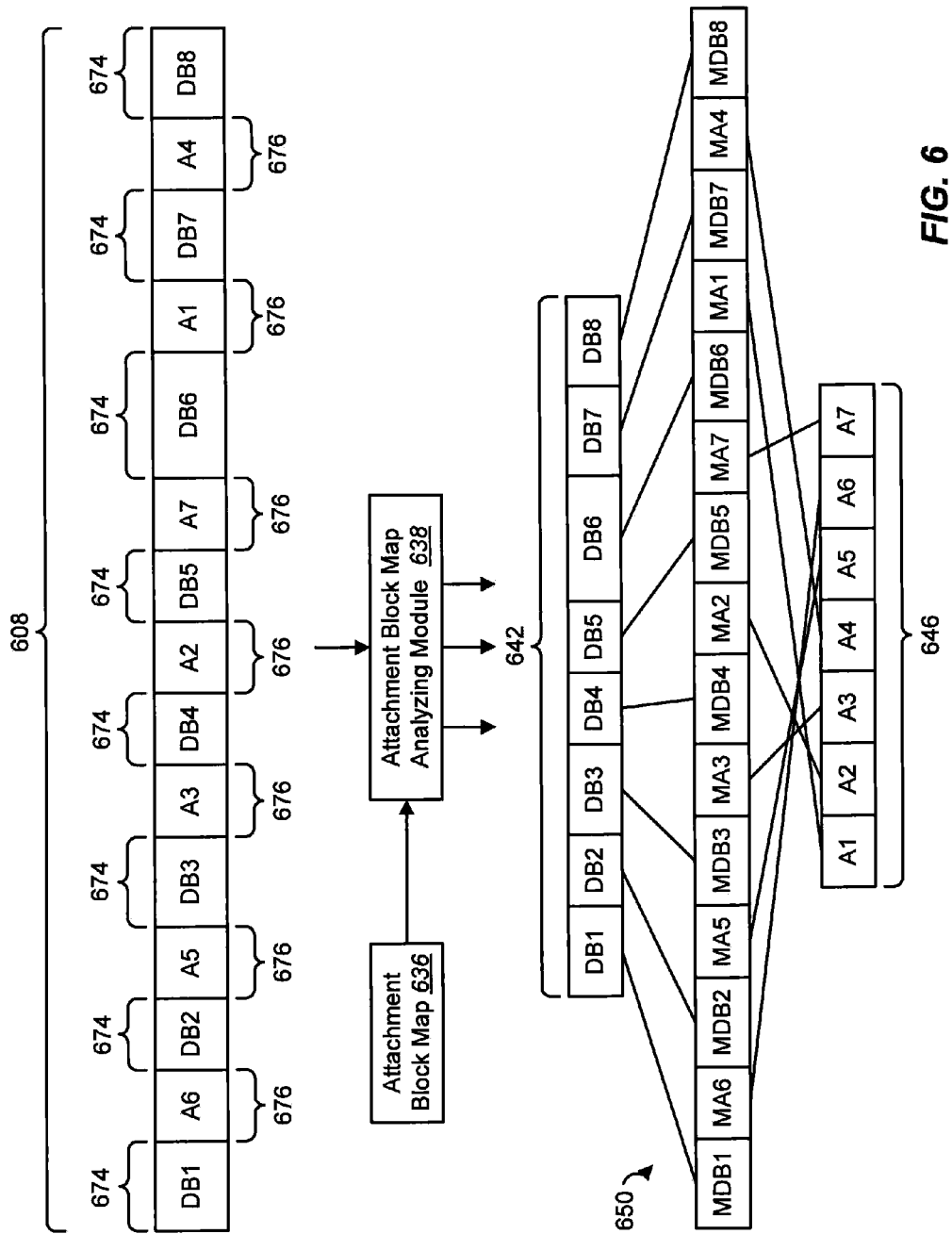
FIG. 6 is a block diagram illustrating one example of creating a transformed data base file.

FIG. 6 is a block diagram illustrating a further example of an original database file 608 being transformed into a database data file 642, an attachment data file 646, and a database file map 650. As previously explained, the database file 608 may include database data blocks 674. As illustrated, the database data blocks 674 may include data blocks DB1, DB2, DB3, DB4, DB5, DB6, DB7, and DB8. Placed intermittently among the database data blocks 674 may be one or more attachment data blocks 676. The attachment data blocks 676 are illustrated as A1, A2, A3, A4, A5, A6, and A7.

In one configuration, an attachment block map analyzing module 638 may analyze an attachment block map 636 that indicates the position of each data block 674, 676 in the database file 608. Using the analysis, the database data blocks 674 may be stripped from or separated from the attachment data blocks 676, to create a database data file 642. The non-attachment data blocks may be placed in the database data file 642 in sequential order. Further, based on the analysis of the attachment block map analyzing module 638, the attachment data blocks 676 may be written into the attachment data file 646 in sequential order. The database file map 650 may indicate the original positions and order of the data blocks 674, 676 within the database file 608. In this example, the block "MDB1" may represent a map data block indicator for the data block 674 "DB1", the block "MA6" may represent a map data block indicator for the data block 676 "A6", and so on.

Figure 7:
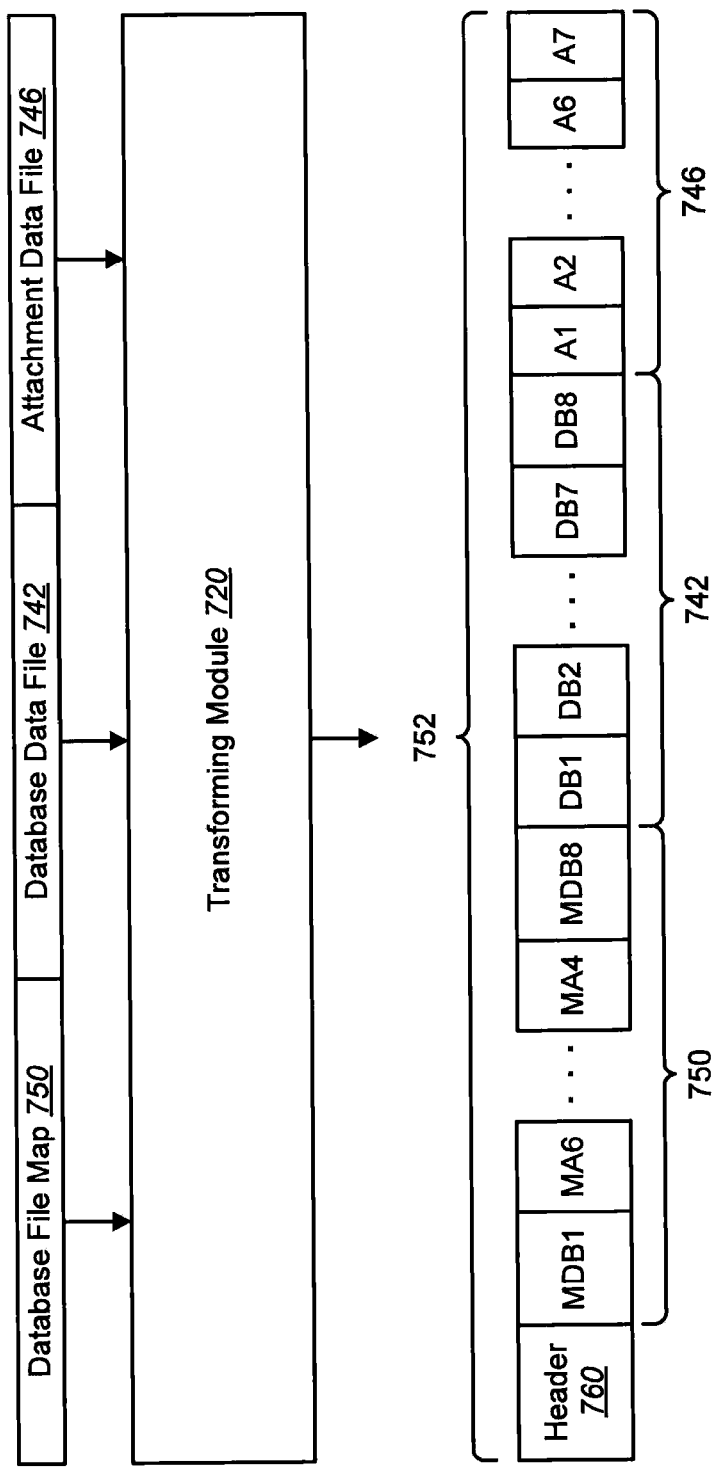
FIG. 7 is a block diagram illustrating a further example of creating the transformed data base file.

FIG. 7 is a block diagram illustrating one example of a transforming module 720 creating a transformed database file 752. In one embodiment, the transforming module 720 may synthesize a database file map 750, a database data file 742, and an attachment data file 746 to create or generate the transformed database file 752. As illustrated, the transformed database file 752 may include header information 760 followed by the database file map 750, the database data file 742, and the attachment data file 746. The transformed database file 752 may be stored in a backup storage device.

Figure 8:
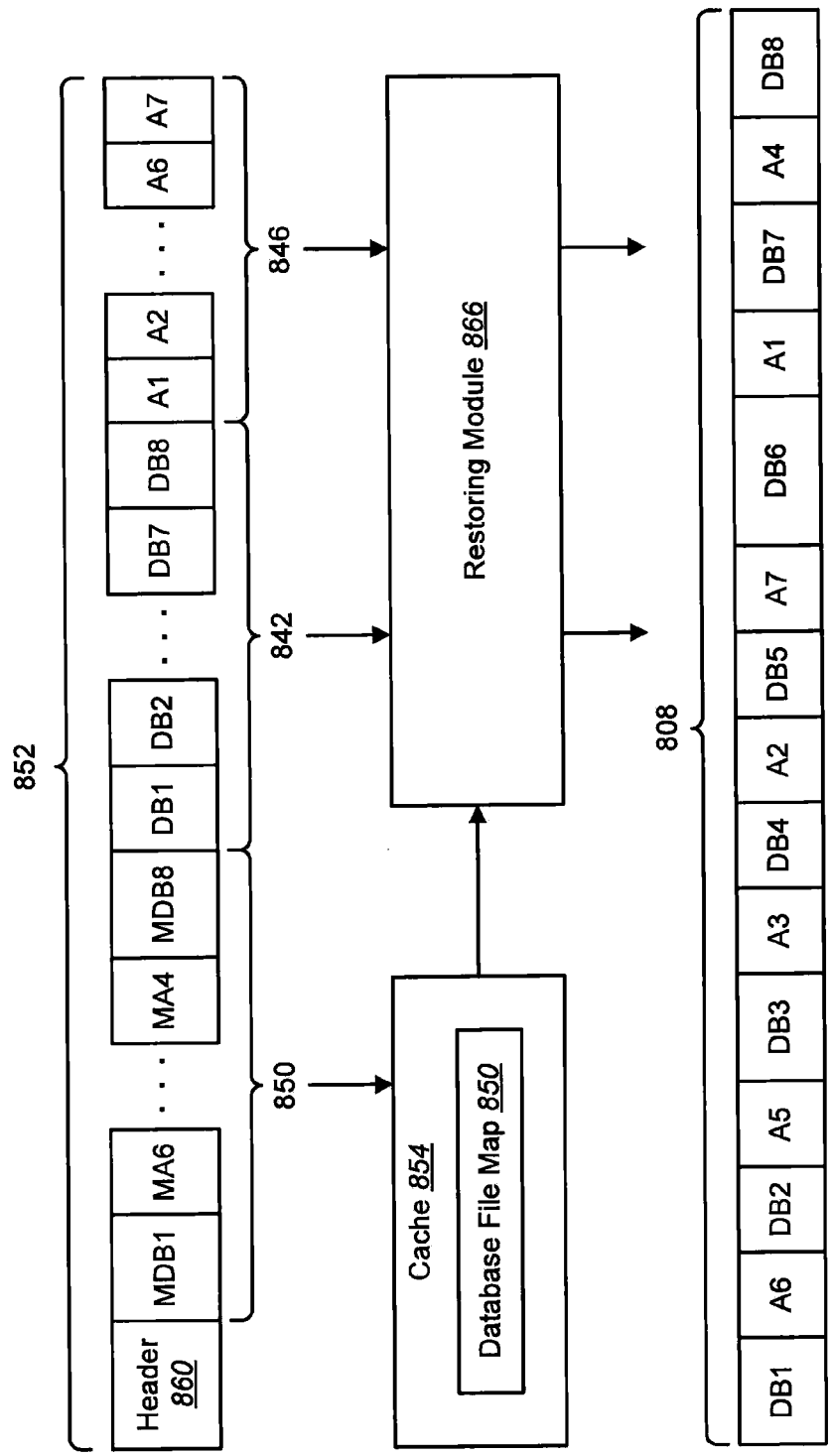
FIG. 8 is a block diagram illustrating one configuration of a transformed database file being restored to an original database file.

FIG. 8 is a block diagram illustrating one example of a restoring module 866 restoring a transformed database file 842 to an original database file 808. In one embodiment, the transformed database file 852 that includes header information 860, a database file map 850, a database data file 842, and an attachment data file 846 may be analyzed by a restoring module 866. In one embodiment, the database file map 850 may be retrieved from the transformed database file 852 (stored on a backup storage device) and stored in cache 854. In one embodiment, the cache 854 may be on a client device in communication with the backup storage device. The restoring module 866 may use the database file map 850 in the cache 854 to rearrange the positions of the data blocks of the database data file 842 and the data blocks of the attachment data file 846 back to the original database file 808. The original database file 808 may resemble the database file before it was transformed by the transforming module 120.

Figure 9:
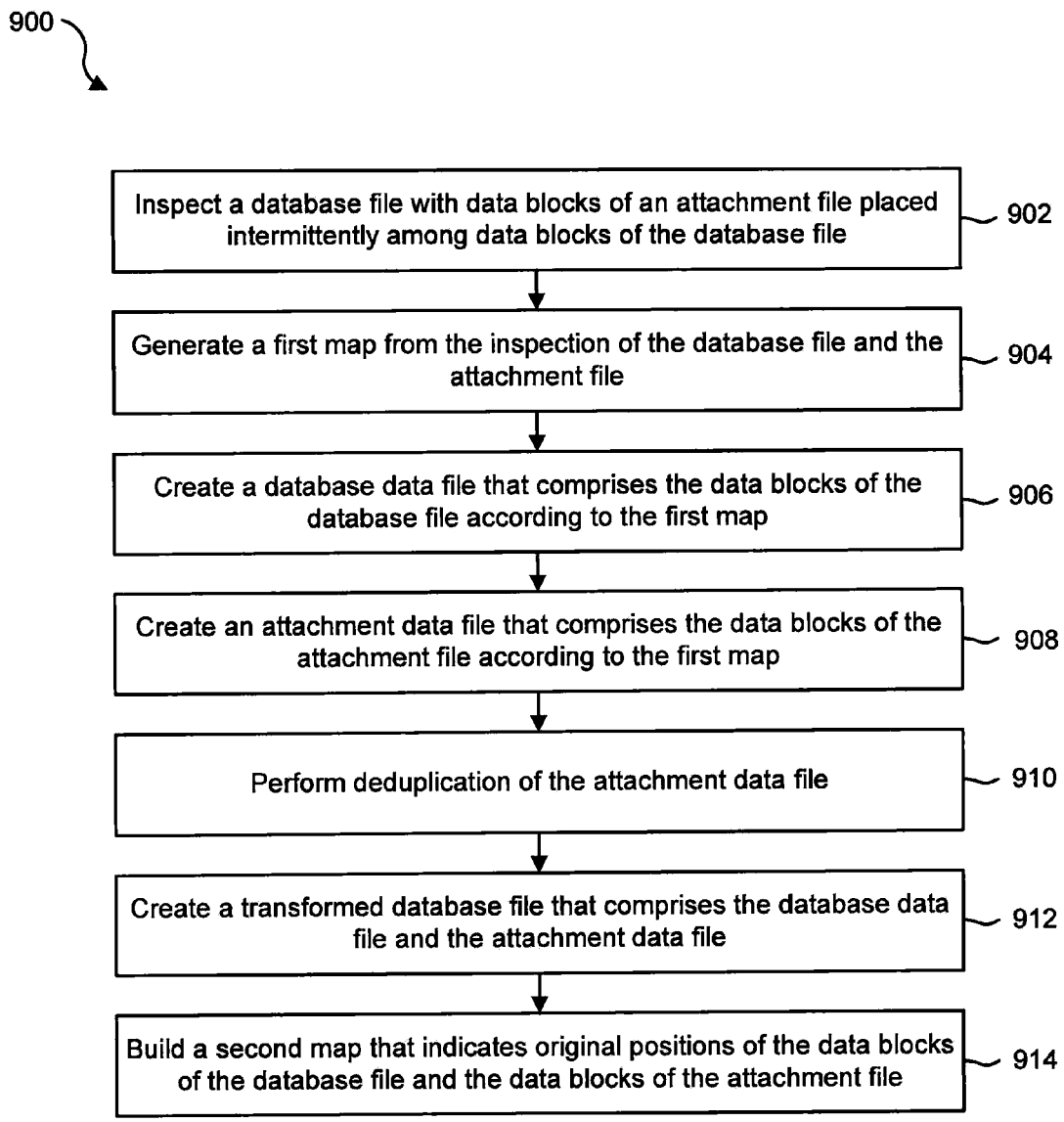
FIG. 9 is a flow diagram illustrating one embodiment of a method for transforming a database file so that an attachment file may be deduplicated across files of different backup formats.

FIG. 9 is a flow diagram illustrating one embodiment of a method 900 for transforming a database file to perform deduplication on an attachment file across various backup formats. In one embodiment, the method 900 may be implemented by the transforming module 120.

In one configuration, a database file with data blocks of an attachment file placed intermittently among data blocks of a database file may be inspected 902. A first map may be generated 904 from the inspection of the database file and the attachment file. A database data file that comprises the data blocks of only the database file may be created 906 according to the first map. An attachment data file that comprises the data blocks of only the attachment file may also be created 908 according to the first map. Deduplication of the attachment data file may be performed 910. In one configuration, the deduplication of the attachment file may be performed across archived files or other backup files stored on a backup storage device. In one configuration, a transformed database file that comprises the database data file and the attachment data file may be created 912. A second map that indicates original positions of the data blocks of the database file and the data blocks of the attachment file may be built 914.

Figure 10:
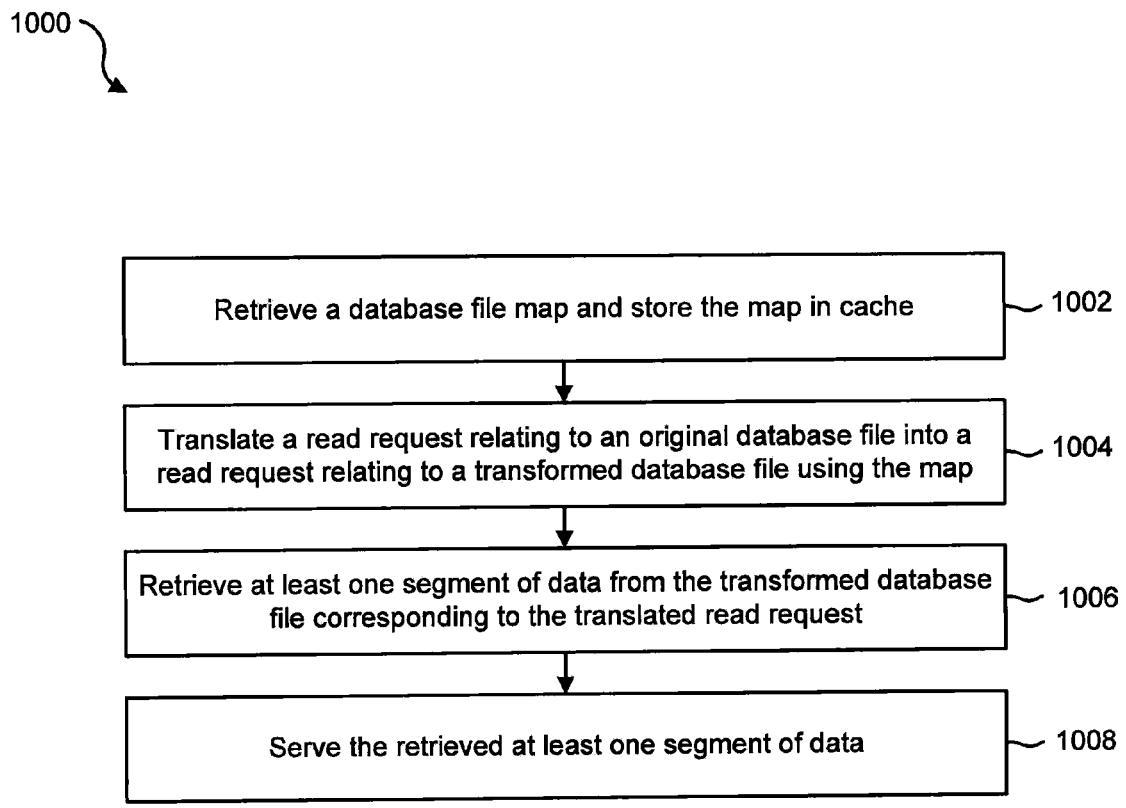
FIG. 10 is a flow diagram illustrating one embodiment of a method for restoring an original database file from a transformed database file.

FIG. 10 is a flow diagram illustrating one embodiment of a method 1000 for restoring an original database file from a transformed database file. In one embodiment, the method 1000 may be implemented by the restoring module 566.

In one embodiment, a database file map may be retrieved 1002 and stored in cache. A read request relating to an original database file may be translated 1004 into a read request relating to a transformed database file using the map. At least one segment of data from the transformed database file corresponding to the translated read request may be retrieved 1006. The retrieved at least one segment of data may be served 1008. For example, given a read request with <offset, size> in the original database file, the given <offset, size> may be translated into <offset, size> corresponding to the transformed database file. Segments corresponding to the translated <offset, size> may be retrieved and the read request may be served with the retrieved segments.

Figure 11:
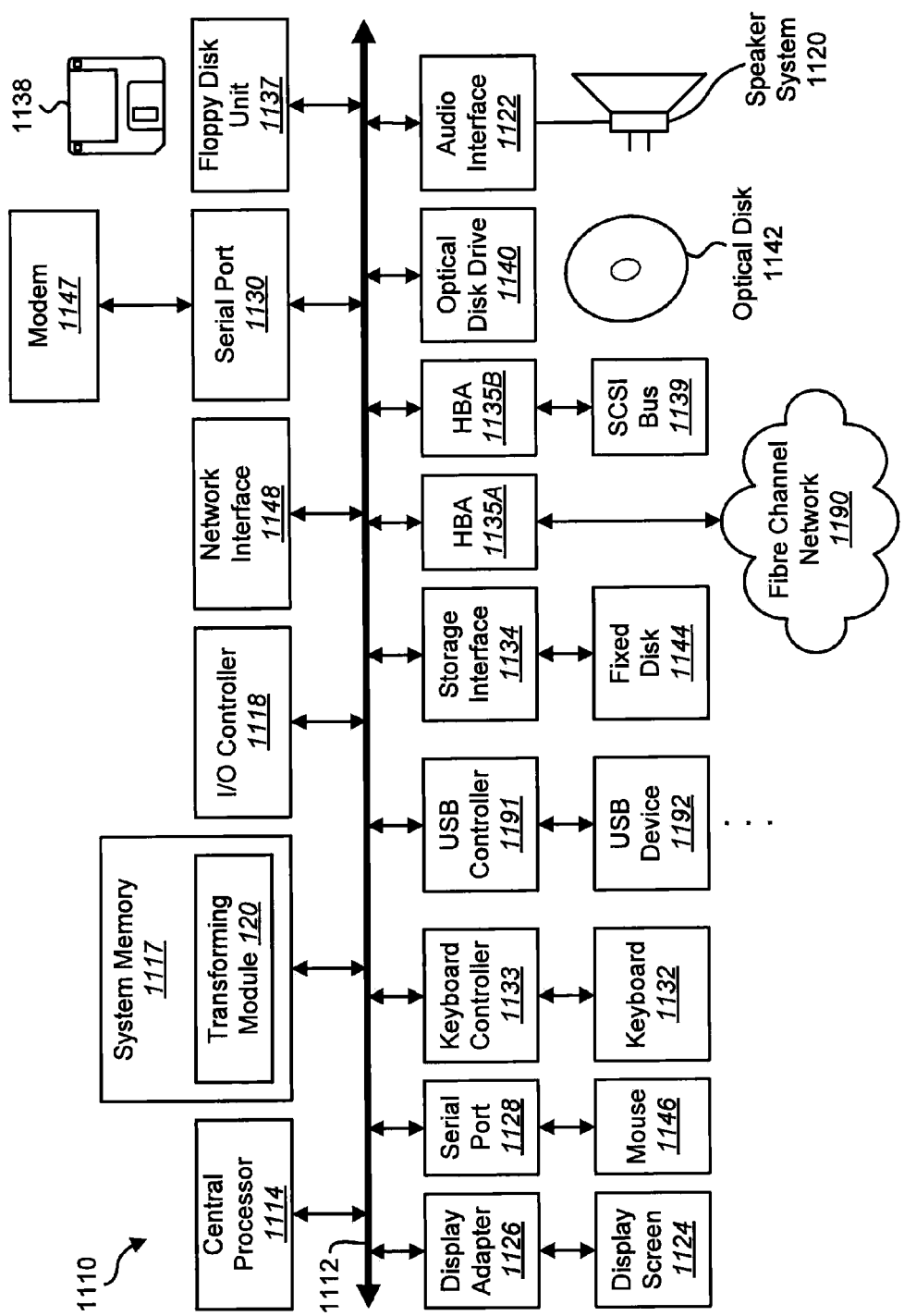
FIG. 11 depicts a block diagram of a computer system suitable for implementing the present systems and methods.

FIG. 11 depicts a block diagram of a computer system 1110 suitable for implementing the present systems and methods. Computer system 1110 may include a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), multiple USB devices 1192 (interfaced with a USB controller 1190), a storage interface 1134, a floppy disk drive 1137 operative to receive a floppy disk 1138, a host bus adapter (HBA) interface card 1135A operative to connect with a Fibre Channel network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the transforming module 120 to implement the present systems and methods may be stored within the system memory 1117. Applications resident with computer system 1110 are generally stored on and accessed via a computer readable medium, such as a hard disk drive (e.g., fixed disk 1144), an optical drive (e.g., optical drive 1140), a floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present systems and methods. The devices and subsystems can be interconnected in different ways from that shown in FIG. 11. The operation of a computer system such as that shown in FIG. 11 is readily known in the art and is not discussed in detail in this application. Code to implement the present disclosure can be stored in computer-readable medium such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 12:
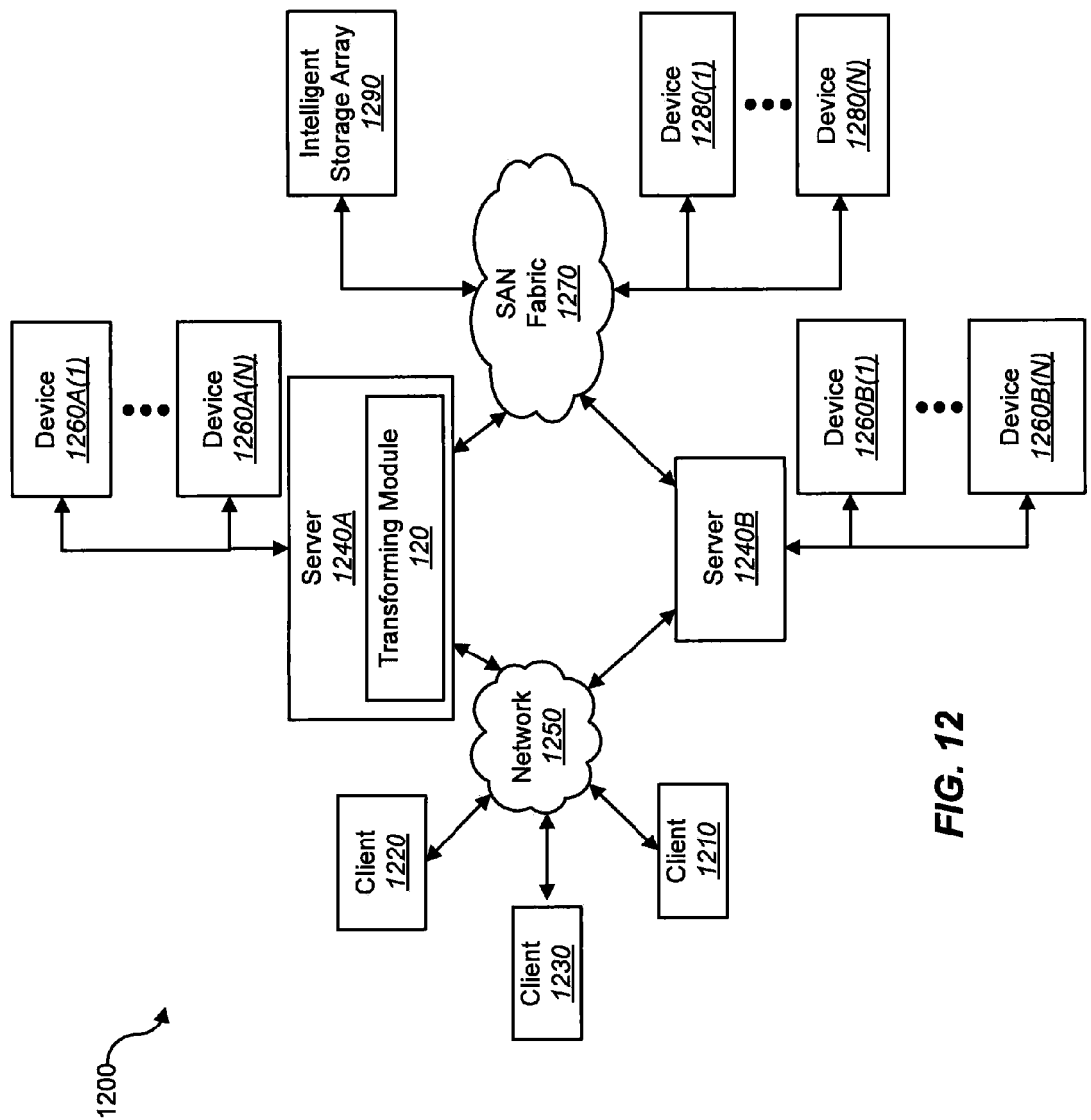
FIG. 12 is a block diagram depicting a network architecture in which client systems, as well as storage servers (any of which can be implemented using computer system), are coupled to a network.

FIG. 12 is a block diagram depicting a network architecture 1200 in which client systems 1210, 1220 and 1230, as well as storage servers 1240A and 1240B (any of which can be implemented using computer system 1210), are coupled to a network 1250. In one embodiment, the transforming module 120 may be located within a server 1240A, 1240B to implement the present systems and methods. The storage server 1240A is further depicted as having storage devices 1260A(1)-(N) directly attached, and storage server 1240B is depicted with storage devices 1260B(1)-(N) directly attached. SAN fabric 1270 supports access to storage devices 1280(1)-(N) by storage servers 1240A and 1240B, and so by client systems 1210, 1220 and 1230 via network 1250. Intelligent storage array 1290 is also shown as an example of a specific storage device accessible via SAN fabric 1270.

With reference to computer system 1110, modem 1147, network interface 1148 or some other method can be used to provide connectivity from each of client computer systems 1210, 1220, and 1230 to network 1250. Client systems 1210, 1220, and 1230 are able to access information on storage server 1240A or 1240B using, for example, a web browser or other client software (not shown). Such a client allows client systems 1210, 1220, and 1230 to access data hosted by storage server 1240A or 1240B or one of storage devices 1260A(1)-(N), 1260B(1)-(N), 1280(1)-(N) or intelligent storage array 1290. FIG. 12 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enabling deduplication of attachment files within a database, comprising:
   identifying a database file comprising a sequence of data blocks of an attachment file of an e-mail message, the attachment file being embedded within the database file among data blocks of the database file;
   identifying each data block of the database file and each data block of the attachment file, the sequence of data blocks of the attachment file being positioned intermittently in a non-sequential order among the data blocks of the database file, wherein, in the database file, a first data block of the attachment file is separated from a second data block of the same attachment file by at least one data block of the database file;

identifying the intermittent and non-sequential order of the sequence of data blocks of the attachment file among the data blocks of the database file;

generating a first map from the identified intermittent and non-sequential order of the sequence of data blocks of the attachment file among data blocks of the database file;

writing the data blocks of the database file to a database data file based on the first map;

arranging the data blocks of the attachment file in sequential order based on the first map;

writing the data blocks of the attachment file to an attachment data file in the arranged sequential order; and deduplicating the attachment data file with at least one other data file.

2. The method of claim 1, wherein the at least one other data file comprises an archived file.

3. The method of claim 1, wherein the at least one other data file comprises a data file backed up by a file system.

4. The method of claim 1, wherein the database is an Exchange Database.

5. The method of claim 1, further comprising generating a second map that indicates original positions of the data blocks of the attachment file among the data blocks of the database file.

6. The method of claim 1, further comprising creating a transformed database file.

7. The method of claim 6, wherein the transformed database file comprises a second map, the database data file, and the attachment data file.

8. The method of claim 7, further comprising retrieving the second map to cache.

9. The method of claim 8, further comprising restoring the database file from the transformed database file by positioning the data blocks of the attachment file among the data blocks of the database file in the original positions according to the second map.

10. A computing device configured to enable deduplication of attachment files within a database, comprising:
a processor;
memory in electronic communication with the processor;
instructions stored in the memory, the instructions being executable by the processor to:
identify a database file comprising a sequence of data blocks of an attachment file of an e-mail message, the attachment file being embedded within the database file among data blocks of the database file;
identify each data block of the database file and each data block of the attachment file, the sequence of, the data blocks of the attachment file being positioned intermittently in a non-sequential order among data blocks of the database file, wherein, in the database file, a first data block of the attachment file is separated from a second data block of the same attachment file by at least one data block of the database file;
identify the intermittent and non-sequential order of the sequence of data blocks of the attachment file among the data blocks of the database file;
generate a first map from the identified intermittent and non-sequential order of the sequence of data blocks of the attachment file among data blocks of the database;
write the data blocks of the database file to a database data file based on the first map;
arrange the data blocks of the attachment file in sequential order based on the first map;
write the data blocks of the attachment file to an attachment data file in the arranged sequential order; and
deduplicate the attachment data file with at least one other data file.

11. The computing device of claim 10, wherein the at least one other data file comprises an archived file.

12. The computing device of claim 10, wherein the at least one other data file comprises a data file backed up by a file system.

13. The computing device of claim 10, wherein the database is an Exchange Database.

14. The computing device of claim 10, wherein the instructions are executable by the processor to:
generate a second map that indicates original positions of the data blocks of the attachment file among the data blocks of the database file.

15. The computing device of claim 10, wherein the instructions are executable by the processor to:
create a transformed database file.

16. The computing device of claim 15, wherein the transformed database file comprises a second map, the database data file, and the attachment data file.

17. The computing device of claim 16, wherein the instructions are executable by the processor to:
retrieve the second map to cache.

18. The computing device of claim 17, wherein the instructions are executable by the processor to:
restore the database file from the transformed database file by positioning the data blocks of the attachment file among the data blocks of the database file in the original positions according to the second map.

19. A computer-program product for enabling deduplication of attachment files within a database, the computer-program product comprising a non-transitory computer-readable medium storing instructions thereon, the instructions being executable by the processor to:
identify a database file comprising a sequence of data blocks of an attachment file of an e-mail message, the attachment file being embedded within the database file among data blocks of the database file;
identify each data block of the database file and each data block of the attachment file, the sequence of, the data blocks of the attachment file being positioned intermittently in a non-sequential order among data blocks of the database file, wherein, in the database file, a first data block of the attachment file is separated from a second data block of the same attachment file by at least one data block of the database file;
identify the intermittent and non-sequential order of the sequence of data blocks of the attachment file among the data blocks of the database file;
generate a first map from the identified intermittent and non-sequential order of the sequence of data blocks of the attachment file among data blocks of the database file;
write the data blocks of the database file to a database data file based on the first map;
arrange the data blocks of the attachment file in sequential order based on the first map;
write the data blocks of the attachment file to an attachment data file in the arranged sequential order; and
deduplicate the attachment data file with at least one other data file.

20. The computer-program product of claim 19, wherein the database is an Exchange Database.

* * * * *